June 14, 1949.  A. T. SCHEIWER  2,473,223
COMBINED VALVE AND COUPLING
Filed March 29, 1947  2 Sheets-Sheet 1

Inventor
Albert T. Scheiwer
By
Florian G. Miller
Attorney

June 14, 1949.     A. T. SCHEIWER     2,473,223
COMBINED VALVE AND COUPLING
Filed March 29, 1947     2 Sheets-Sheet 2

Inventor
Albert T. Scheiwer
By Florian G. Miller
Attorney

Patented June 14, 1949

2,473,223

UNITED STATES PATENT OFFICE 2,473,223

COMBINED VALVE AND COUPLING

Albert T. Scheiwer, Erie, Pa.

Application March 29, 1947, Serial No. 738,043

6 Claims. (Cl. 284—18)

This invention relates generally to a combined valve and more particularly to a combined valve and coupling for high pressure lines.

All devices of this character made in accordance with the teachings of the prior art, and with which I am familiar, have not been adaptable for use in high pressure lines because of the force necessary to move parts of the coupling member against the force of the fluid in the line. No satisfactory coupling connection with valves has been heretofore provided for a high pressure line.

It is, accordingly, an object of my invention to provide a combined valve and snap coupling for a high pressure fluid line which is simple in construction, economical in cost, efficient in operation, and economical in manufacture.

Another object of my invention is to provide a combined valve and snap coupling for high pressure fluid lines wherein no fluid is lost upon connection.

Another object of my invention is to provide a double check valve in the female member of a coupling.

Another object of my invention is to provide means for holding a locking sleeve out of engagement with camming members of a female member of a coupling when the coupling is disconnected.

Other objects of my invention will become evident from the following detailed description, taken in conjunction with the accompanying drawings, in which.

Figures 1, 2:
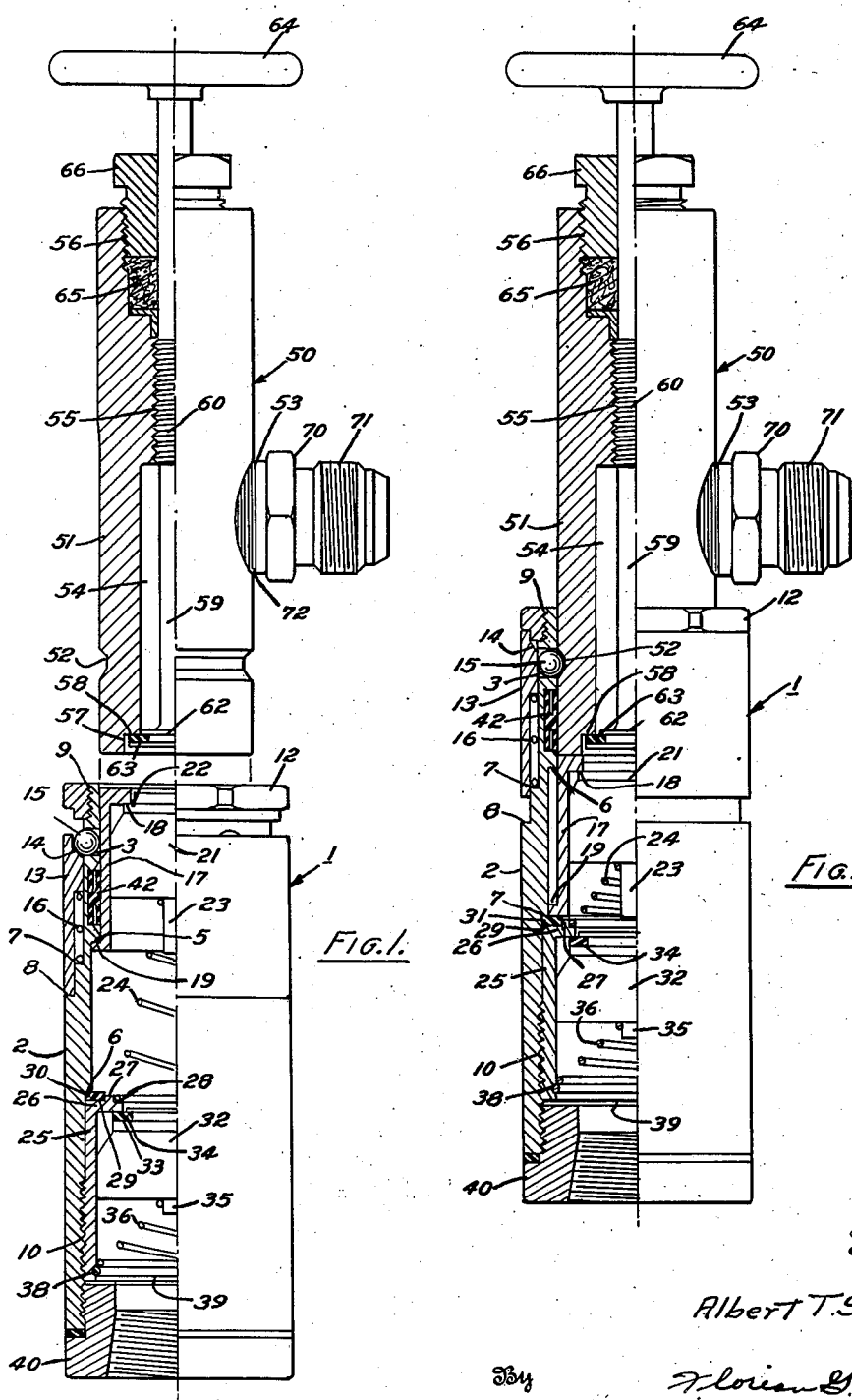
Fig. 1 is a side elevational view partly in cross section of the male and female members of my novel coupling in a disconnected position.
Fig. 2 is a side elevational view with one side thereof broken away showing my novel coupling members connected together with both the male and female members still sealed.
Figure 3:
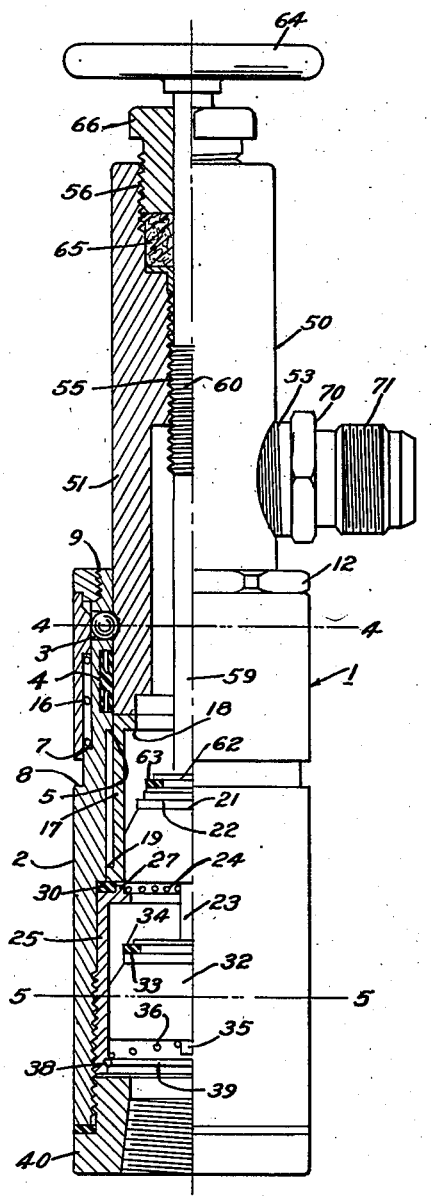
Fig. 3 is a side elevational view with one side thereof broken away of my novel coupling with the check valves in the female member in an open, unsealed position.
Figure 4:
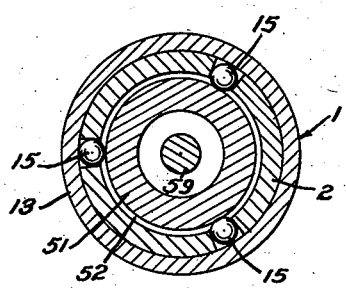
Fig. 4 is a view taken on the line 4—4 of Fig. 3.
Figure 5:
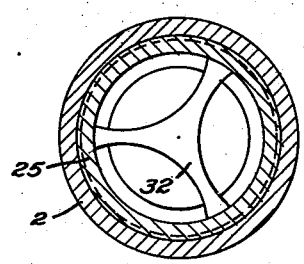
Fig. 5 is a view taken on the line 5—5 of Fig. 3.

Referring now to the drawings, Figs. 1 to 5, inclusive, show a female member 1 comprising a sleeve 2 having ball retaining apertures 3, inner peripheral groove 4, inner shoulders 5 and 6, stepped outer shoulders 7 and 8, externally threaded portion 9, and internally threaded portion 10. A stop member 12 is threadably engaged with the threaded portion 9 of the sleeve 2 to form a stop for the locking sleeve 13 having a camming portion 14 for locking engagement with ball members 15 disposed in ball retaining apertures 3 of the sleeve 2. Spring 16 urges the camming portion 14 of the locking sleeve 13 into locking engagement with the ball members 15. An inner sleeve 17 has oppositely disposed end flanges 18 and 19, the outwardly extending flange 18 engaging the shoulder 5 of the sleeve 2. Check valve 21 is disposed in the sleeve 17 and has a sealing portion 22 for sealing engagement with the inner flange 18 of the sleeve 17. The check valve 21 has a longitudinally extending stem 23 forming a guide for a spiral spring 24 which urges the sealing portion 22 of the check valve 21 in sealing engagement with the inner flange 18 of the sleeve 17. Sleeve 25 has an inner flanged portion 26 with an upwardly extending annular projection 27 forming a cut-away portion 28 for nesting one end of the spring 24 and a cut-away portion 29 for receiving a washer 30 which is disposed between the sleeve 25 and shoulder 6 of the sleeve 2. A check valve 32 is disposed in the sleeve 25 and has a sealing portion 33 and washer 34 for sealing engagement with the flanged portion 26 of the sleeve 25. A stem 35 extends longitudinally of the check valve 32 for forming a guide for a spiral spring 36 having the outer end thereof held by a spring clip 38 disposed in a groove 39 in the sleeve 25. The sleeve 25 is held in the sleeve 2 by threaded cap member 40 threadably engaged with the internally threaded portion 10 of the sleeve 2. A double U-shaped washer 42 is disposed in the groove 4 of the sleeve 2.

A male member 50 comprises a cylindrical member 51 having a peripheral groove 52, a laterally extending threaded aperture 53, longitudinally extending central aperture 54, a reduced threaded portion 55 connecting the aperture 54, an enlarged threaded portion 56, and a counterbore 57, forming a seat 58. A stem 59 has a threaded portion 60 for threadably engaging threaded portion 55 of the cylindrical member 51 and has an enlarged head 62 with a sealing washer 63 attached thereto for sealing engagement with the seat 58 in the cylindrical member 51. The upper end of the valve stem 59 has a handle 64 for rotation of the valve stem 59. Suitable packing 65 is disposed around the valve stem 59, and a threaded gland member 66 threadably engages the threaded portion 56 of a cylindrical member 51 to provide a seal for the upper end of the valve stem 59. A branch fitting 70 having threaded portions 71 and 72 threadably engages the threaded aperture 53 in the cylindrical member 51.

When the male and female members 1 and 50 are disconnected, the locking sleeve 13 is normally held in the position shown in Fig. 1, by the ball members 15 forced outwardly by sleeve 17. By inserting cylindrical member 51 of the male member 50 into the sleeve 2 of the female member 1, the sleeve 17 moves longitudinally to a position shown in Fig. 2, wherein the ball members 15 engage the groove 52 of the male member 50, and the camming portion 14 of the locking sleeve 13 moves against the stop member 12 to lock the ball members 15 into locking engagement with the groove 52 of the male member 50. By rotating the handle 64 of the valve stem 59, the valve stem 59 moves longitudinally, thereby breaking the seal between the washer 53 and the seat 58, and also, upon further movement, the seal between the flanged portion 18 of the sleeve 17 in the female member 1 and the seating portion 22 of the check valve 21. Upon further longitudinal movement of the valve stem 59, the stem 23 of the check valve 21 engages the check valve 32 to move the washer 34 out of sealing engagement with the flange 26 of the sleeve 25, thereby permitting fluid to flow through both members of the coupling.

It will be evident that when the male member is inserted into the female member 1, there is practically no pressure behind the check valve 21 against which the male member must be forced. This coupling, therefore, permits the connection of a snap ball type coupling in fluid lines, where the pressure is five hundred or more pounds per square inch. The check valve 32, which checks the fluid under high pressure, in the fluid line is not opened until the male and female members 2 and 50 are securely connected together. My novel coupling requires no manual intervention upon connection of the male and female members 2 and 50 and the locking is done automatically upon insertion of the male member 50 into the female member 1.

Various changes may be made in the specific embodiment of my invention without departing from the spirit thereof, or from the scope of the appended claims.

What I claim is:

1. A coupling comprising a female member having a fixed and a movable flanged sleeve therein, check valves sealingly engaging said flanged sleeves in said female member, camming members engaging by said movable sleeve, locking means for said camming members, a male member for disposal in said female member adapted to move said movable sleeve longitudinally in said female member and having a groove for locking engagement by the camming members of said female member, and a longitudinally movable manually operated valve in said male member adapted to move said check valves in said female member longitudinally progressively.

2. A coupling comprising a female member having a fixed flanged sleeve and a movable flanged sleeve disposed therein, spring urged check valves adapted to sealingly engage the flanged portion of said sleeves, camming members carried by said female member adapted to be engaged by said movable sleeve, locking means for said camming members, a male member having a peripheral groove adapted to be disposed in said female member and also adapted to move said movable sleeve longitudinally out of engagement with said camming members, and a longitudinally movable manually operated valve in said male member having an enlarged lower end for sealingly engaging a seating portion on said male member and adapted to move said check valves in said female member longitudinally progressively.

3. A coupling as set forth in claim 2 wherein said check valve in said movable sleeve has an outwardly extending stem adapted to engage the check valve in said fixed sleeve to open said check valve.

4. A coupling as set forth in claim 2 wherein said male member has a laterally extending fluid connection.

5. A coupling as set forth in claim 2 wherein said female member has an oppositely directed U-shaped washer for sealingly engaging the movable sleeve disposed therein.

6. A coupling comprising a female member, a movable flanged sleeve in said female member, camming members in said female member adapted to be engaged by said sleeve when said female member is disconnected, locking means for said camming members on said female member, a male member having a connecting portion with a peripheral groove for disposal in said female member adapted to move said flanged sleeve longitudinally and be lockingly engaged by the camming members of said female member, said male member having a longitudinal bore, and a stem extending through said bore having a seating member on the lower portion thereof for sealingly engaging said male member, said stem being adapted to move the check valve in said sleeve of said female member longitudinally progressively on connection of said male and said female members.

ALBERT T. SCHEIWER.

REFERENCES CITED

The following references are of record in the file of this patent:

UNITED STATES PATENTS

| Number | Name | Date |
|---|---|---|
| 1,376,868 | Gibson | May 3, 1921 |
| 1,633,642 | Kramer | June 28, 1927 |
| 1,861,396 | Isbell | May 31, 1932 |
| 2,079,949 | Novati | May 11, 1937 |
| 2,112,146 | Di Giovanni | Mar. 22, 1938 |
| 2,203,922 | Paisley | June 11, 1940 |